United States Patent
Hajj et al.

(10) Patent No.: US 10,397,355 B2
(45) Date of Patent: Aug. 27, 2019

(54) SYSTEM AND METHOD FOR MULTI-DEVICE CONTINUUM AND SEAMLESS SENSING PLATFORM FOR CONTEXT AWARE ANALYTICS

(71) Applicant: AMERICAN UNIVERSITY OF BEIRUT, Beirut (LB)

(72) Inventors: Hazem Hajj, Beirut (LB); Wassim El Hajj, Beirut (LB); Saeid Eid, Bchamoun Aley (LB); Mohammed Sulaiman Bensaleh, Riyadh (SA); Abdulfattah Mohammad Obeid, Riyadh (SA); Syed Manzoor Qasim, Riyadh (SA)

(73) Assignee: American University of Beirut, Beirut (LB)

( * ) Notice: Subject to any disclaimer, the term of this patent is extended or adjusted under 35 U.S.C. 154(b) by 509 days.

(21) Appl. No.: 15/139,292

(22) Filed: Apr. 26, 2016

(65) Prior Publication Data
US 2017/0124110 A1    May 4, 2017

Related U.S. Application Data

(60) Provisional application No. 62/248,781, filed on Oct. 30, 2015.

(51) Int. Cl.
*G06F 16/178* (2019.01)
*H04L 29/08* (2006.01)
*H04W 4/38* (2018.01)

(52) U.S. Cl.
CPC .......... *H04L 67/2838* (2013.01); *H04L 67/12* (2013.01); *H04W 4/38* (2018.02)

(58) Field of Classification Search
CPC ......... G06F 17/30174; G06F 17/30185; G06F 17/30353; G06F 16/178; G06F 16/1805; G06F 16/2322; H04L 67/1095
See application file for complete search history.

(56) References Cited

U.S. PATENT DOCUMENTS 6,249,789 B1 *   6/2001   Delia ................. G06Q 10/04
2004/0267623 A1 * 12/2004 Vivadelli ........... G06Q 50/01
                                                              379/212.01

(Continued)

FOREIGN PATENT DOCUMENTS

WO   WO 2014/160549    10/2014    ............ G06Q 50/24
WO   WO 2015/085800     6/2015    ............ H04L 29/08

(Continued)

OTHER PUBLICATIONS

Banos, O., et al., "PhysioDriod: Combining wearable health sensors and mobile devices for a ubiquitous, continuous and personal monitoring" *Scientific World Journal* www.ncbi.nlm.nih.gov/pmc/articles pp. 1-19 (2014).

(Continued)

*Primary Examiner* — Hasanul Mobin
(74) *Attorney, Agent, or Firm* — J. Peter Paredes; David G. Rosenbaum; Rosenbaum IP, P.C.

(57) ABSTRACT

The Multi-Device Continuum and Seamless Sensing Platform for Context Aware Analytics provide a platform for continuous sensing across multiple devices towards a unified target. The Multi-Device Continuum and Seamless Sensing Platform provides a platform for extracting, loading, integrating, and tracking related data across multiple smart devices capable of integrating with internal and external sensors, such as wearable devices. The Multi-Device Continuum and Seamless Sensing Platform develop context aware solutions, which are targeted at automated recognition of context extracted from users' devices, as people are often always interacting with a digital device such as phone, tablet, or desktop.

12 Claims, 5 Drawing Sheets

(56) References Cited

U.S. PATENT DOCUMENTS

| | | | | |
|---|---|---|---|---|
| 2011/0172504 | A1* | 7/2011 | Wegerich | A61B 5/0205 600/301 |
| 2013/0091250 | A1* | 4/2013 | Ko | H04L 67/2814 709/219 |
| 2013/0103764 | A1* | 4/2013 | Verkasalo | G06Q 30/02 709/204 |
| 2013/0132480 | A1* | 5/2013 | Tsuji | G06Q 10/06 709/204 |
| 2013/0197679 | A1 | 8/2013 | Balakrishnan et al. | 700/91 |
| 2013/0198227 | A1* | 8/2013 | Fradkin | G06F 16/245 707/769 |
| 2014/0019397 | A1* | 1/2014 | Alexander | H04W 4/029 706/46 |
| 2014/0223462 | A1* | 8/2014 | Aimone | A61B 5/0476 725/10 |
| 2014/0347491 | A1 | 11/2014 | Connor | 348/158 |
| 2015/0018660 | A1 | 1/2015 | Thomson et al. | 600/393 |
| 2015/0046828 | A1* | 2/2015 | Desai | G06F 1/163 715/739 |
| 2015/0087478 | A1 | 3/2015 | Zhang et al. | 482/8 |
| 2015/0099945 | A1 | 4/2015 | Hawkins, III et al. | |
| 2015/0100245 | A1 | 4/2015 | Huang et al. | |
| 2015/0127284 | A1* | 5/2015 | Seshan | G01D 3/022 702/89 |
| 2015/0182149 | A1* | 7/2015 | Rapoport | A61B 5/1123 702/19 |
| 2015/0324636 | A1* | 11/2015 | Bentley | G11B 27/17 386/227 |
| 2016/0026873 | A1* | 1/2016 | Wexler | H04N 5/2257 348/158 |
| 2016/0039424 | A1* | 2/2016 | Hong | B60W 40/08 701/2 |
| 2016/0048943 | A1* | 2/2016 | Isberg | G06Q 50/01 382/276 |
| 2016/0170996 | A1* | 6/2016 | Frank | G06F 17/30702 707/748 |
| 2017/0109584 | A1* | 4/2017 | Yao | G06K 9/00718 |

FOREIGN PATENT DOCUMENTS

| | | | | |
|---|---|---|---|---|
| WO | WO 2015/103330 | | 7/2015 | A61B 5/00 |
| WO | WO 2015/103335 | | 7/2015 | A61B 5/00 |

OTHER PUBLICATIONS

Castiglione, F., et al., "Physio-environmental sensing and live modeling" *Interact J Med Res* 2(1): 1-18 (2013).

Eagle, N., et al., "Reality mining: sensing complex social systems" *Pers Ubiquit Comp* 10(4): 255-269 (2006).

Gemmell, J., et al., "MyLife bits: a personal database for everything" *Communications of the ACM* 2006 49: 88-95 (2006).

Kim, I., et al., "PERSONE: Personalized experience recoding and searching on networked environment" In Proceedings of the 3rd ACM Workshop on Continuous Archival and Retrieval of Personal Experiences: Oct. 27, 2006; Santa Barbara, USA. ACM, http://www.rearchgate.net/publication/2348774 pp. 49-54 (2006).

Reza, R., et al., "UbiqLog: A generic mobile phone based LifeLog framework" *Personal and Ubiquitous Computing* 17(4): 621-637 (2013).

Ruiz-Fernandiz, D., et al., "dFisio track: A telerehabilitation environment based on motion recognition using accelerometry" *The Scientific World Journal* 2014: 1-18 (2014).

Shah, M., et al., "Lifelogging: Archival and retrieval of continuously recorded audio using wearable devices" *Emerging Signal Applications (ESPA), 2012 IEEE International Conference on.* IEEE, pp. 1-4 (2012).

* cited by examiner

```
with matched_records as
(
SELECT acc.Timestamp as ACCTimestamp,
(
    SELECT TOP 1 timestamp
    FROM MagnetometerStatistics Mag
    ORDER BY abs(datediff(ss,acc.timestamp,Mag.timestamp))
) as MagTimestamp
FROM
AccelerometerStatistics acc
)
SELECT *
FROM
    matched_records mr
    join AccelerometerStatistics accStat on
        accStat.TimeStamp = mr.ACCTimestamp
    join MagnetometerStatistics MagStat on
        MagStat.TimeStamp = mr.MagTimestamp
```

FIG. 6

SYSTEM AND METHOD FOR MULTI-DEVICE CONTINUUM AND SEAMLESS SENSING PLATFORM FOR CONTEXT AWARE ANALYTICS

CROSS-REFERENCE TO RELATED APPLICATIONS

The present application claims priority from U.S. Provisional Application Ser. No. 62/248,781, filed Oct. 30, 2015, incorporated herein by reference its entirety.

BACKGROUND OF THE INVENTION

The invention generally relates to sensing devices and applications.

The market of spy applications for mobile phones and computers is increasing and used mainly for parental supervision of their children's phone usages. Several logging applications exist in the market: Android Keylogger: http://www.android-keylogger.net/. Easy Logger: http://logger.mobi/. iKeyMonitor: http://ikeymonitor.com/. KidLogger: http://kidlogger.net/. However, these applications can collect data only from phones or only from computers but without any integration. Furthermore, they are not set for data analytics.

In academic research, data logging has also focused on specified platforms: Mohit Shah et al. extract sensor data only from external sensors for aggregation and analysis. Shah, Mohit, et al. "Lifelogging: Archival and retrieval of continuously recorded audio using wearable devices." Emerging Signal Processing Applications (ESPA), 2012 IEEE International Conference on. IEEE, 2012.

MyLifeBits done by Gemmell et al. is a system for storing lifetime data on a database. It stores data from personal computers and photos taken by SenseCam, which is a mobile device that has a camera module, digital light sensor, temperature sensor, and passive infrared sensor. Gemmell J, Bell G, Lueder R: MyLifeBits: A Personal Database for Everything. Communications of the ACM 2006, 49:88-95.

Eagle et al. proposed a "reality mining" system that measured information access and used within different contexts, recognized social patterns in daily user activities, and inferred relationships. They used standard Bluetooth-enabled mobile phones Eagle N, Pentland A: Reality mining: sensing complex social systems. Personal and Ubiquitous Computing 2006, 10(4):255-268. These researchers focused on collecting data with special devices and thus limited their sensing system on contrary to our system where data collection is done through digital devices used daily by people such as phones, tablets, computers, as further described below.

PERSONE done by Kim et al. is a Web-based life log media browser in which videos and audio are gathered by a special gadget. It can be browsed with a conventional timeline view and a map view. Kim et al. "PERSONE: Personalized Experience Recoding and Searching On Networked Environment". In Proceedings of the 3rd ACM Workshop on Continuous Archival and Retrieval of Personal Experiences: 27 Oct. 2006; Santa Barbara, USA. ACM; 2006:49-54.

Rawassizadeh, Reza, et al. designed Life-logs (personal e-memories) which are used to record users' daily life events and assist them in memory augmentation. Life-logs sense and store users' contextual information from their environment through sensors, which are core components of life-logs. Spatio-temporal aggregation of sensor information can be mapped to users' life events. UbiqLog, a lightweight and extendable life-log framework that uses mobile phone as a device for life logging. It is an application for mobile devices that collects personal information from the users and saves them in independent entities (every life action is saved in its own entity). Storage of the collected data was out of the research's scope. The research depended only on embedded sensors (no external sensors) and was limited to mobile devices. Rawassizadeh, Reza, et al. "UbiqLog: a generic mobile phone-based life-log framework." Personal and ubiquitous computing 17.4 (2013): 621-637.

Life logging systems are quite widespread and receiving an increasing attention, however the prior art is focusing on specified domains and environments such as limitations to mobile phones or specific devices. The present invention attempts to solve these problems as well as others.

SUMMARY OF THE INVENTION

Provided herein are systems, methods and apparatuses for a Multi-Device Continuum and Seamless Sensing Platform for Context Aware Analytics. The Multi-Device Continuum and Seamless Sensing Platform system generally comprises a processor; and memory storing computer readable instructions that, when executed, cause the system to: collect sensing data from a plurality of digital devices by a sensing application; align and synchronize the collected sensing data from the sensing application to an integrated system; and process the aligned and synchronized sensing data in a database.

The Multi-Device Continuum and Seamless Sensing Platform apparatus generally comprises a processor; and memory operatively coupled to the processor and storing computer readable instructions that, when executed, cause the apparatus to: receive collected data from a plurality of digital devices; store collected data in an integrated system; synchronize the collected data across the plurality of digital devices; and organize the synchronized data into a plurality of tables.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any non-claimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The research for analyzing, understanding, and summarizing the daily life of humans is receiving an increasing attention recently, in particular with the technological evolution to Internet of things.

The Multi-Device Continuum and Seamless Sensing Platform for Context Aware Analytics provide a platform for continuous sensing across multiple devices towards a unified target. The Multi-Device Continuum and Seamless Sensing Platform provides a platform for extracting, loading, integrating, and tracking related data across multiple smart devices capable of integrating with internal and external sensors, such as wearable devices, and integrating with social media networking services. The Multi-Device Continuum and Seamless Sensing Platform develop context aware solutions, which are targeted at automated recognition of context extracted from users' devices, as people are often always interacting with a digital device such as phone, tablet, or desktop. Since most people are now users of multiple devices, there is a need for tracking personal related data across multiple devices. The Multi-Device Continuum and Seamless Sensing Platform extract human related information and context continuously and seamlessly as the user navigates across multiple devices.

In some embodiments, some or all of the functions or process(es) described herein and performed by a mobile electronic device are implemented or supported by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

In general, a mobile telecommunications device may include any mobile telecommunications device such as, but not limited to, a mobile (e.g., cellular) phone or equivalent, including an iPhone™, Droid™, or the like. A mobile telecommunications device typically may include a processor or other computing module/device which may include software, hardware, or the like, including machine readable code configured to operate the device to receive and/or send information from the apparatus described herein. Such code may be provided with, or separately from, the apparatus described. A mobile telecommunications device may be referred to (and includes) a cell or cellular phone or telephone, a mobile phone or telephone, a smartphone, smart eye glasses (Google Glasses™) or virtual reality glasses; an handheld computer, tablet, a wearable computer, a wearable sensor, an electronic book reader, electronically-functional jewelry, or the like. Code may be referred to a software, or application software ("app" or "application") and may be downloaded from a remote location onto the mobile telecommunications device.

Gathering data and personal information from different devices and environments needs a system to integrate and synchronize them into one centric database so that data analysis can take place. In prior work, device sensor data collection for personal use was limited to individual devices. Furthermore, raw data was being saved randomly in data tables which make retrieving summaries and reporting a very slow and complicated task. The Multi-Device Continuum and Seamless Sensing Platform provides an integration and aggregation system application that organizes raw data sent to the database and adds the appropriate measures and attributes needed which will ease summarization and reporting and positively impact the performance.

The Multi-Device Continuum and Seamless Sensing Platform provide a framework for continuous sensing across multiple devices through seamless integration and continuous data load and store from multiple sensing devices. This framework is used as means for recording details of a user's personal life, which can then be useful for playback of events and learning from the past for future beneficiary predictions. The Multi-Device Continuum and Seamless Sensing Platform comprises designs, algorithms, code, and applications that are deployed on different devices including smartphones, tablets, desktops, and wearable smart devices for collecting sensing data for later analysis and machine learning analytics. The design is modular and scalable so new devices can be added seamlessly.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

A social networking service (also social networking site or SNS) is a platform to build social networks or social relations among people who share similar interests, activities, backgrounds or real-life connections. A social network service consists of a representation of each user (often a profile), his or her social links, and a variety of additional services such as career services. Social network sites are web-based services that allow individuals to create a public profile, create a list of users with whom to share connections, and view and cross the connections within the system. Most social network services are web-based and provide means for users to interact over the Internet, such as e-mail and instant messaging. Social network sites are varied and they incorporate new information and communication tools such as mobile connectivity, photo/video/sharing and blogging. Online community services are sometimes considered a social network service, though in a broader sense, social network service usually means an individual-centered service whereas online community services are group-centered. Social networking sites allow users to share ideas, pictures, posts, activities, events, and interests with people in their network. The main types of social networking services are those that contain category places (such as former school year or classmates), means to connect with friends (usually with self-description pages), and a recommendation system linked to trust. Popular methods now combine many of these, with American-based services such as Facebook, Google+, LinkedIn, Instagram, Reddit, Pinterest, Vine, Tumblr, and Twitter widely used worldwide; Nexopia in Canada; Badoo, Bebo, Vkontakte (Russia), Delphi, Draugiem.lv (Latvia), iWiW (Hungary), Nasza-Klasa (Poland), Soup (Austria), Glocals in Switzerland, Skyrock, The Sphere, StudiVZ (Germany), Tagged, Tuenti (mostly in Spain), Myspace, Xanga and XING in parts of Europe; Hi5 in South America and Central America; Mxit in Africa; Cyworld, Mixi, Renren, Friendster, Sina Weibo and Wretch in Asia and the Pacific Islands.

The Multi-Device Continuum and Seamless Sensing Platform generally comprises: a design for seamless integration and persistence of data from different sensing devices; a data schema for data store on each device enabling integration for continuous sensing across devices; a design for integrating new sensing devices into the framework; a design and implementation for a modular application developed for smartphones. The application is designed with plug-in capabilities where new modules for sensing new data can be easily added. The application is called SenseXP.

In another embodiment, the Multi-Device Continuum and Seamless Sensing Platform generally comprise a design and implementation for a modular application developed for tablets. The application is designed with plug-in capabilities where new modules for sensing new data can be easily added. The application may be called SenseXT.

In another embodiment, the Multi-Device Continuum and Seamless Sensing Platform generally comprise a design and implementation for a modular application developed for desktops. The application is designed with plug-in capabilities where new modules for sensing new data can be easily added. The application may be called SenseXD.

In another embodiment, the Multi-Device Continuum and Seamless Sensing Platform generally comprise a design and implementation for data integration to collect personal information from different daily devices and stored in one database In another embodiment, the Multi-Device Continuum and Seamless Sensing Platform generally comprise an integrating system that joins digital and physical activities from various devices into one centric database.

In another embodiment, the Multi-Device Continuum and Seamless Sensing Platform generally comprise a design for integration and data retrieval from social media platforms and social networking services such as but not limited to Facebook™ and Twitter™ and the like. As used herein, a social media network may include any system, service, or platform that supports an exchange of media content between entities, individuals, groups, and others, using any type or form of technology. The social media networks herein may comprise internet-based forums, social networks, blogs, microblogs, bookmarking sites (e.g., focused on a specific medium (pictures, videos, etc.) and/or subjects (technology, fashion, food, etc.), and other techniques). The Multi-Device Continuum and Seamless Sensing Platform generally comprise a design for integration and data retrieval through an Application Programming Interfaces (APIs) to social media platforms. A different application programming interface (API) may be required for different social media networks. An API may specify the interface used by software components to communicate with each other. API's and other social media network components may be used to define a plug-in for each of the social media networks. In some embodiments, a plug-in may refer to a software data structure that is instantiated to facilitate communicating between Multi-Device Continuum and Seamless Sensing Platform and the one or more social media networks, for example, collect social media data associated with its customers, clients, sales prospects, and others from the social media networks. In some aspects, social media facade may support communication and interfacing with any and all social media networks, including those currently known and those that become known in the future.

In another embodiment, the Multi-Device Continuum and Seamless Sensing Platform generally comprise an integrated platform that supports continuous sensing for the same user seamlessly across multiple devices. The platform includes components for:

Data collection on individual devices, e.g. phones, tablets and PCs with plug-in capabilities where additional features can be easily added.

In another embodiment, the Multi-Device Continuum and Seamless Sensing Platform generally comprises collection of hard and soft sensors data from individual smart devices and enabling smart devices to collect data from external sensors such as bio-sensors and wearable sensors.

Sensors may include accelerometers, gyroscopes, position or location sensors, pressure sensors, etc.), while information about the user's physical attribute(s) is based on data collected from one or more biometric sensors (e.g., a sensor configured to detect a biometric parameter). A biometric parameter is any biological phenomenon exhibited by a person, body or a surrounding environment. In one embodiment, the sensors may be embedded in mobile device (e.g., a smartphone) carried by the user. In another embodiment, the sensors may be physically separate from the mobile device, but physically attached or affixed to the user's body, and further in communication with the mobile device. Another embodiment may provide for a combination thereof.

In one embodiment, the Multi-Device Continuum and Seamless Sensing Platform generally comprises integrating corresponding data across multiple devices; aligning and synchronizing corresponding data from the multitude of devices; storing and persisting integrated centrally in preparation for further processing and analytics; and organizing, processing and aggregating sense data stored from the loggers in specialized tables for reporting services and data analytics.

Designs and approaches for aligning and joining data from different data tables with common attributes but captured at different granularity instances. Three methods of synchronization are provided with specific choices of similarity measures and using 1NN machine learning for aligning records: 1) time-based synchronization based on time-based similarity measures between tuples in tables; 2) location-based synchronization based on spatial-based similarity measures between tuples in tables; and 3) select Attribute-based synchronization between tables by assessing similarities between tuples based on the select attributes.

The platforms and processes may reside in a server-type processing device or system physically separate from the mobile device, and the mobile device transmits the sensor data to the server-type processing device. This transmission may be done by communications via wireline, wireless or combination thereof. In yet other embodiments, one or more of the platforms or processes may be incorporated within the mobile electronic device and one or more may reside external to the device. Wireless transmitters, such as those conforming to the Bluetooth™ Smart (also known as Bluetooth™ Low Energy) or ANT™ protocols, by which the locally stored data may be transmitted to another device during or after the completion of an event. The transmitter may also receive wireless communication. In one example, the transceiver operates over the Bluetooth™ Low Energy protocol, which is compatible with iPhone™ and other smart phone technologies and has otherwise been ubiquitously adopted in many areas. It is also possible to use a wireless transceiver that communicates over the ANT™ protocol, a standard adopted and used by many fitness products, or other types of transceivers available now or in the future. The system may include one or more communications components for wireless transmission and reception of data. In an example, multiple communications components can enable wireless communication (including data exchange) between separate components of such a device and system. In an example, a communications component can enable wireless communication with an external device or system. In various examples, the means of this wireless communication can be selected from the group consisting of: radio transmission, Bluetooth transmission, Wi-Fi, and infrared energy. It is also possible that some information will not be stored locally but rather transmitted in real-time, depending on how the device is configured, for remote storage, computation, and/or display. Using the open API, devices, such as a smart phone or tablet, may include apps or applications that receive, process, and display the data and derivations thereof. Moreover, such apps may also be used to configure the device, select an activity that controls how the device records data and processes activity information. In the case of activity selection, if the user selects running, the device will record and interpret data knowing the data pertains to the activity of running. Similarly, if the user runs a swimming app that sets a swimming mode within the device, the device will record and interpret the data knowing the data pertains to the activity of repeatedly swimming lengths in a pool. If the device is configured in a riding mode, then various riding protocols, such as riding cadence and riding posture, may be initiated and data recorded and/or transmitted. Activities would be selected through a user interface on a remote device, and the selection wirelessly transmitted to the device.

The Multi-Device Continuum and Seamless Sensing Platform is a design for the addition and plug-in of new sensing devices into the platform. The Multi-Device Continuum and Seamless Sensing Platform is targeted at personal context aware sensing and the Internet of things. Portable digital devices constitute a major part of the humans' lives and thus the Multi-Device Continuum and Seamless Sensing Platform offers a continuous and seamless collection of personal, digital and hard sensor data from users any time, any place. Examples of specific applications are in the fields of: Health care devices and applications (fall detection, patients' observation and medical attention); Social networking and sharing (sharing daily activities over the social media); Devices' personalization and auto-management; and Security on devices, where after a certain training period, an application can be built to analyze the collected data from the devices and determines the user on these devices.

A Health care device may be any device for receiving biological parameters, such as patient vitals. The biological parameters may also be referred to as biometric data. For example, a medical sensing device may be a thermometer, blood pressure transducer, glucose monitor, pulse oximeter, pulse rate meter, pedometer, activity monitor, hydration monitor, sound sensor, chemical sensor, and the like. Other health care devices include sensors selected from the group consisting of: receptor-based sensor, enzyme-based sensor, reagent based sensor, antibody-based receptor, biochemical sensor, membrane sensor, pH level sensor, osmolality sensor, nucleic acid-based sensor, or DNA/RNA-based sensor; a biomimetic sensor (such as an artificial taste bud or an artificial olfactory sensor), a chemiresistor, a chemoreceptor sensor, a electrochemical sensor, an electroosmotic sensor, an electrophoresis sensor, or an electroporation sensor; a specific nutrient sensor (such as a glucose sensor, a cholesterol sensor, a fat sensor, a protein-based sensor, or an amino acid sensor); a color sensor, a colorimetric sensor, a photochemical sensor, a chemiluminescence sensor, a fluorescence sensor, a chromatography sensor (such as an analytical chromatography sensor, a liquid chromatography sensor, or a gas chromatography sensor), a spectrometry sensor (such as a mass spectrometry sensor), a spectrophotometer sensor, a spectral analysis sensor, or a spectroscopy sensor (such as a near-infrared spectroscopy sensor); and a laboratory-on-a-chip or microcantilever sensor. Other health care devices are sensors can be selected from the group consisting of: neuroelectrical sensor, action potential sensor, ECG sensor, EKG sensor, EEG sensor, EGG sensor, capacitance sensor, conductivity sensor, impedance sensor, galvanic skin response sensor, variable impedance sensor, variable resistance sensor, interferometer, magnetometer, RF sensor, electrophoretic sensor, optoelectronic sensor, piezoelectric sensor, and piezocapacitive sensor. The Health care devices or systems referred to herein are typically digital systems because they may display a numeric (e.g., digital) representation of the biological parameter. For example, the devices may convert analog biological parameters (e.g., temperature, blood sugar, blood pressure, or any other health metric information) into digital signals that may be displayed or otherwise presented to the user. For example, a Health care system may include a digital thermometer for taking a subject's temperature, a blood cuff for presenting patient blood pressure, a blood sugar (glucose) monitors, a pulse oximeter, or the like, including combinations of these devices. Health care systems or devices for home use are of particular interest, and especially those having sensors that monitor or collect biological parameters from patients and present the information on a display. As used herein biological parameters or information may include any patient information that is processed, sensed, and/or calculated by a Health care systems, and particularly digitally encoded biological parameters. For example, biological parameters may include temperature, blood pressure, blood sugar level, pH, oxygenation, pulse rate, respiratory rate, or any other biological measurement, particularly those relevant to medical case, including diagnosis and health monitoring.

Other Health care devices may include sensors selected from the group consisting of: a blood monitor (for example using a blood pressure monitor, a blood flow monitor, or a blood glucose monitor); a brain monitor (such as an electroencephalographic monitor); a heart monitor (such as electrocardiographic monitor, a heartbeat monitor, or a pulse rate monitor); a mouth function monitor (such as a chewing sensor, a biting sensor, a jaw motion sensor, a swallowing sensor, or a saliva composition sensor); a muscle function monitor (such as an electromyographic monitor or a muscle pressure sensor); a nerve monitor or neural monitor (such as a neural action potential monitor, a neural impulse monitor, or a neuroelectrical sensor); a respiration monitor (such as a breathing monitor, an oxygen consumption monitor, an oxygen saturation monitor, a tidal volume sensor, or a spirometry monitor); a skin sensor (such as a galvanic skin response monitor, a skin conductance sensor, or a skin impedance sensor); and a stomach monitor (such as an electrogastrographic monitor or a stomach motion monitor). In various examples, a sensor can monitor sonic energy or electromagnetic energy from selected portions of a person's gastrointestinal tract (ranging from the mouth to the intestines) or from nerves which innervate those portions. In an example, a monitor or sensor can monitor peristaltic motion or other movement of selected portions of a person's gastrointestinal tract.

In another embodiment, the Multi-Device Continuum and Seamless Sensing Platform can provide a personal life recorder for a user, which can be useful for playback of events and learning from the past, and then provide future predictions. Such continuous and detailed data for a human's daily life has a huge impact on the understanding of humans by researchers and companies who target deliveries that are tailored to user needs.

The technological evolution toward the Internet of things is receiving an increasing attention nowadays especially since most people are now users of multiple devices and always interacting with a digital device (phone, laptop, tablet, smart watch, etc). Thus the Multi-Device Continuum and Seamless Sensing Platform satisfies the need for tracking personal related data across multiple devices. The Multi-Device Continuum and Seamless Sensing Platform is providing better and applicable methods to extract human related information and context continuously and seamlessly as the user navigates across multiples devices.

This Multi-Device Continuum and Seamless Sensing Platform provide a platform for continuous sensing across multiple devices toward a unified target. The invention provides a platform for extracting, loading, integrating, and tracking related data across multiple smart devices capable of integrating with internal and external sensors such as wearable devices. This invention provides several applications that are deployed on different devices including smartphones, tablets, and wearable smart devices for collecting sensing data for later analysis and machine learning analytics.

The Multi-Device Continuum and Seamless Sensing Platform provides means for recording details of a user's personal life, which can then be useful for playback of events and learning from the past for future beneficiary predictions. The goal is to extract human related information and context continuously and seamlessly as the user navigates across multiples devices. And eventually collecting sensing data can be used later for analysis and machine learning analytics.

In one embodiment, Multi-Device Continuum and Seamless Sensing Platform provides feedback to the person that is selected from the group consisting of: auditory feedback (such as a voice message, alarm, buzzer, ring tone, or song); feedback via computer-generated speech; mild external electric charge or neural stimulation; periodic feedback at a selected time of the day or week; phone call; text or push notification; pre-recorded audio or video message by the person from an earlier time; television-based messages; and tactile, vibratory, or pressure-based feedback.

In one embodiment, the Multi-Device Continuum and Seamless Sensing Platform comprises: a Framework for continuous data collection with plug-in capability to add new devices; a modular design on each device to support plug-in capabilities allowing the developers or users to add any needed additional feature to the applications; a plurality of applications are implemented and installed on different digital devices such as phones, tablets, and laptops, desktops, wearable devices, and other personal devices or things capable of collecting data of personal interest; at least some digital sensing data is collected from sensors embedded inside the devices, external sensors and from logging the usual and daily actions applied on these devices; design an aggregation application to process and store the raw data collected from the devices into a specialized set of data tables in a data warehouse whose structure is conducive for data mining and analytics; and a plurality of cloud store applications are used to gather, synchronize and save data on the cloud (cloud storage, local storage, online streaming, etc.).

Figure 1:
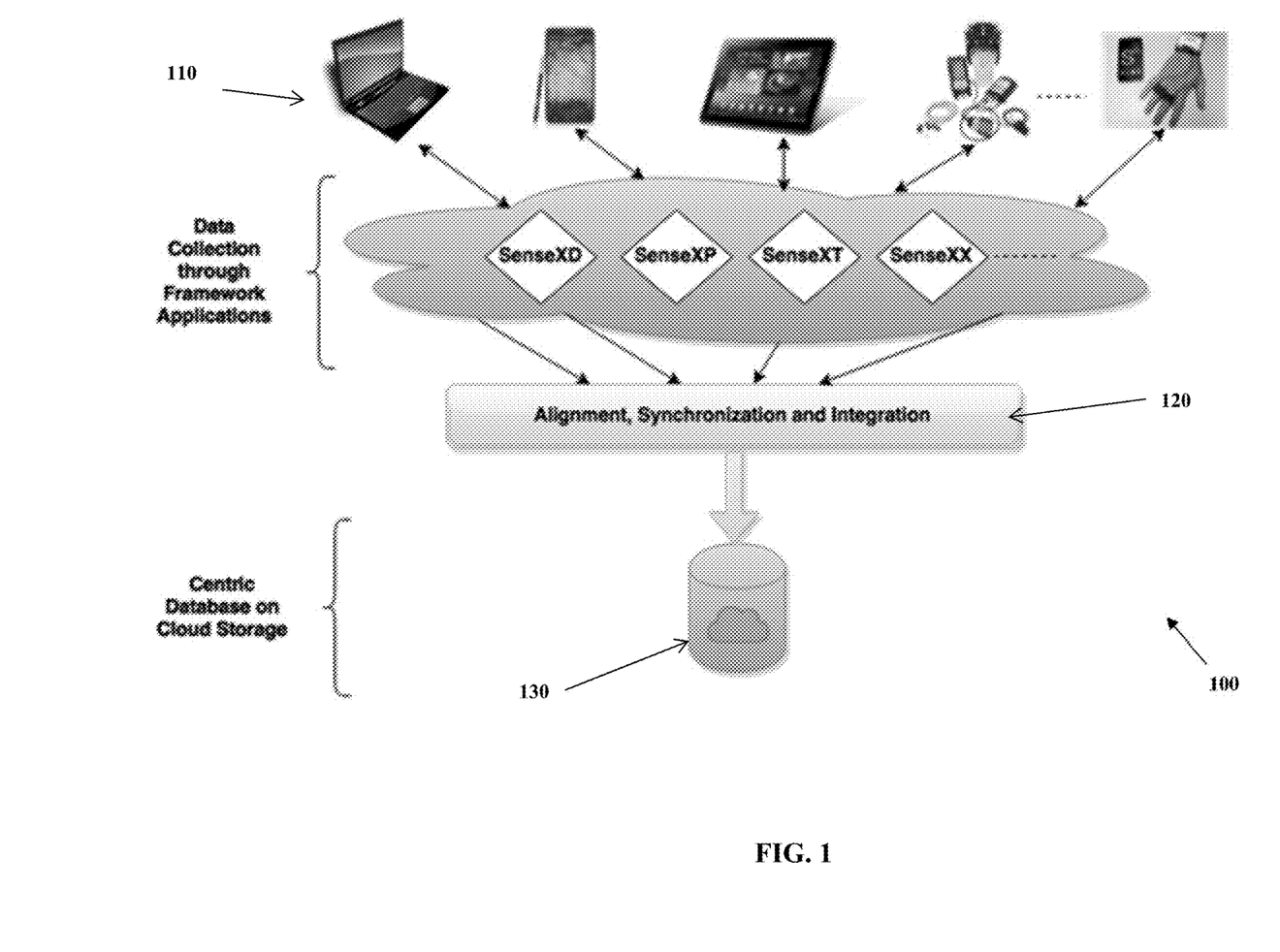
FIG. 1 is a schematic flow chart of the Architecture of the Continuum Sensing System
Figure 2:
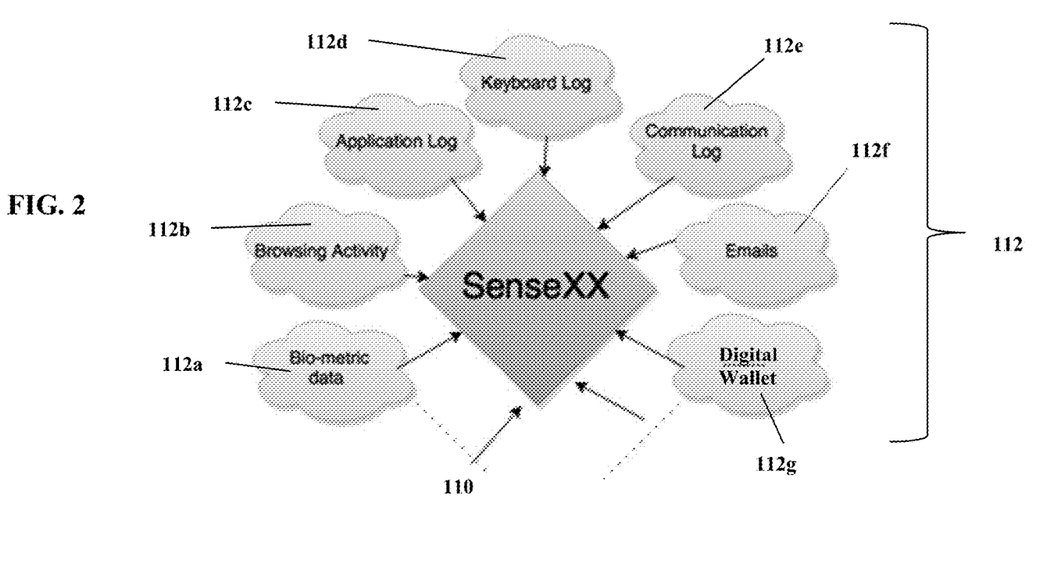
FIG. 2 is a schematic flow chart of the Architecture of the framework sensing applications showing its plug-in capabilities.

As shown in FIGS. 1-2, the Multi-Device Continuum and Seamless Sensing Platform 100 is schematically represented. The Multi-Device Continuum and Seamless Sensing Platform 100 generally comprises a plurality of sensing applications 110 or software programs, an integrating system 120 operably coupled to the plurality of sensing applications 110, and a cloud storage system 130 operably coupled to the integrating system. The plurality of sensing Applications 110 is a set of framework applications to collect sensing data 112 from various external digital devices, including a laptop computer 110a, a mobile phone 110b, a table 110c, a health care device 110d, or a sensing device. The plurality of sensing Applications 110 is scalable where additional devices and their respective applications can be added to the system. The framework applications have plug-in capabilities where features collected from the devices can be added continuously. In one embodiment, as shown in FIG. 2, the sensing application 110 is SenseXX and collects a plurality of data points from the user's smartphone (as SenseXP), Tablets (as SenseXT) and Desktops (as SenseXD), including, but not limited, biometric data 112a, browsing activity 112b, application logs 112c, keyboard logs 112d, communication log, 112e, emails 112f, digital wallets 112g, texts, and the like. The Integrating System 120 consists of a computer system responsible for alignment, synchronization and integration of the sensing data collected through the framework applications in the plurality of sensing Applications 110. The Cloud Storage 130 stores the processed data is stored in a centric database on the cloud storage. Cloud storage is a model of data storage where the digital data is stored in logical pools, the physical storage spans multiple servers (and often locations), and the physical environment is typically owned and managed by a hosting company, such as such as Dropbox™, Onedrive™, and the like. These cloud storage providers are responsible for keeping the data available and accessible, and the physical environment protected and running. People and organizations buy or lease storage capacity from the providers to store user, organization, or application data. Cloud storage services may be accessed through a co-located cloud computer service, a web service application programming interface (API) or by applications that utilize the API, such as cloud desktop storage, a cloud storage gateway or Web-based content management systems.

The sensing applications 110 are operably coupled to a computer that may include a processing unit and system memory. The processing unit may be any type of processing device for executing software instructions, but may conventionally be a microprocessor device. The system memory may include both a read-only memory (ROM) and a random access memory (RAM). As will be appreciated by those of ordinary skill in the art, both the read-only memory (ROM) and the random access memory (RAM) may store software instructions for execution by the processing unit.

The processing unit and the system memory are connected, either directly or indirectly, through a bus or alternate communication structure to one or more peripheral devices. For example, the processing unit or the system memory may be directly or indirectly connected to additional memory storage, such as the hard disk drive and the removable optical disk drive. Computer may further use or interface with other memory storage mediums such as solid state drives, removable magnetic disk drives and flash memory cards. The processing unit and the system memory also may be directly or indirectly connected to one or more input devices and one or more output devices. The input devices may include, for example, a keyboard, touch screen, a remote control pad, a pointing device (such as a mouse, touchpad, stylus, trackball, or joystick), a scanner, a camera or a microphone. The output devices may include, for example, a monitor display, television, printer, stereo, or speakers.

Still further, the computer may be directly or indirectly connected to one or more network interfaces for communicating with a network. This type of network interface, also sometimes referred to as a network adapter or network interface card (NIC), translates data and control signals from the computing unit 203 into network messages according to one or more communication protocols, such as the Transmission Control Protocol (TCP), the Internet Protocol (IP), and the User Datagram Protocol (UDP). Network adapters may be wireless or wired or combinations thereof. These protocols are well known in the art, and thus will not be discussed here in more detail. An interface may employ any suitable connection agent for connecting to a network, including, for example, a wireless transceiver, a power line adapter, a modem, or an Ethernet connection. Connection agents may similarly be wireless or wired or a combination thereof. Accordingly, using interface, computer may be able to access wide area networks such as the Internet in addition to local area networks. In one or more arrangements, a user may browse websites or other network devices through a local or wide area network using interface. Data such as physical activity may be transmitted to or received from local or remote network sources.

Other peripheral devices may be included with or otherwise connected to the external digital devices, as is well known in the art. In some cases, a peripheral device may be permanently or semi-permanently connected to the computing unit. For example, with many computers, the computing unit, the hard disk drive, the removable optical disk drive and a display are semi-permanently encased in a single housing. Still other peripheral devices may be removably connected to the computer, however. The computer may include, for example, one or more communication ports through which a peripheral device can be connected to the computing unit (either directly or indirectly through the bus). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, the computer may include a wireless data "port," such as a Bluetooth interface, a Wi-Fi interface, an infrared data port, or the like.

It should be appreciated that the external digital devices employed according to various examples of the invention may include more components than the computer, fewer components than the computer, or a different combination of components than the computer. Some implementations, for example, may employ one or more computing devices that are intended to have a very specific functionality, such as a digital music player, a sensing application or server computer. These computing devices may thus omit unnecessary peripherals, such as the network interface, removable optical disk drive, printers, scanners, external hard drives, etc. Some implementations may alternately or additionally employ computing devices that are intended to be capable of a wide variety of functions, such as a desktop or laptop personal computer. These computing devices may have any combination of peripheral devices or additional components as desired.

In addition to receiving data from the plurality of sensing Applications, the Integrating System may also be configured to transmit data to devices. For example, synchronization of data between the Integrating System and the plurality of sensing Applications may include transmitting physical activity or computer data recorded by a first sensing application to a second sensing application and/or downloading historical activity data recorded by the first sensing application back to the first sensing application. In some instances, not all data may be transmitted from one sensing application to another and instead, data may be filtered based on data compatibility, activity type, user performing the activity and the like. For example, a receiving sensing application may be required to have the capability to record the same type of data (e.g., have the same type of sensor) as the data to be synchronized from the transmitting sensing application. In another example, data might only be synchronized if the receiving device is configured to track and/or monitor an activity type corresponding to the data. Various other rules may be used to process synchronization requests. Activity and data points may always be synchronized so long as the receiving device has the ability to track activity and data points.

In some examples, transmission and synchronization of data between two sensing applications may be facilitated by the Integrating system. For example, the Integrating system may be configured to convert data sent using a first communication protocol with which a receiving device is incompatible to a second communication protocol with which the receiving device is compatible. Additionally or alternatively, the content of the data may be modified by the Integrating system according to formatting requirements of the sensing applications (e.g., character limits, image sizes, number formats, date formats, etc.) and data storage structures or parameters of the sensing applications. In one example, user profile information may be automatically imported from one sensing application to another sensing application. Various data fields available on the first sensing application might not exist on the second sensing application and thus, the Integrating system may filter out data for those fields prior to synchronizing the information to the second sensing application. The Integrating system may be configured to perform a variety of other data and protocol manipulation functions to provide compatibility between two sensing applications.

As discussed, the sensing applications may initially detect and store activity data and subsequently synchronize the data with one or more of a digital device/sensing application and/or an Integrating system. In one arrangement, the Integrating system may represent a destination or preferred storage site due to a larger storage capacity. Accordingly, data recorded by the sensing application and/or synchronized to a local sensing application such as a digital device may be ultimately transferred to the Integrating system for long-term storage so as not to require and/or occupy large data storage capacities in the sensing application and/or the local digital device. The local digital device may be a mobile communication device such as a smart phone, a portable media device, tablet computer, netbook computer, or laptop computer and/or a stationary device such as a desktop computer.

In some arrangements, an intermediary sensing application such may execute a synchronization application configured to synchronize data between the sensing application and the Integrating system. Such an intermediary sensing application and synchronization application might not be configured to synchronize data between the intermediary sensing application and the first sensing application. Instead, the synchronization application might only synchronize data between the digital device and the Integrating system and only provide such synchronization functionality when a connection to the Integrating system is available. In another example or arrangement, a local sensing application may synchronize activity data from the digital device independently of synchronizing the data with the Integrating system. Once a network connection is available with the Integrating system or when the user elects to synchronize with the Integrating system, the data may be subsequently synchronized to the Integrating system from the intermediary sensing application.

Other synchronization processes may also be used. For example, a sensing application may synchronize data through the intermediary sensing application. In yet other examples, the sensing application may be configured to communicate directly with the Integrating system (e.g., without first communicating with the local digital device or the intermediary sensing application/device) and synchronize data therewith. As well, the one or more intermediary sensing applications, with or without any local digital device(s), may synchronize among any combination thereof, e.g., depending on connectivity, the desirability to keep such combination(s) of devices in synchrony or otherwise. The sensing applications may or may not be synchronized together with any such combinations of intermediary and/or local digital device(s). The Integrating system may or may not be synchronized together with any such combinations of intermediary and/or local digital device(s) and/or sensing applications.

In order to reduce the amount of overlap in data transmitted and synchronized, various parameters/settings may be defined to track the data that has been synchronized to the Integrating system and to a sensing application. In one example, the sensing application may store two parameters: a local read offset (LRO) and a local read time stamp (LRTS). The local read offset (e.g., memory location identifier) may indicate the offset in the sensing application storage (e.g., flash memory) at which the sensing application should begin reading activity data from the digital device when synchronizing. For example, this memory location or offset may specify a location where a first unread activity data record is stored. In some arrangements, the LRO may represent a synchronization offset for the sensing application to which data is synchronized (versus the Integrating system to which data might also be synchronized). The local read time stamp indicates the time stamp of the last sample read by the local sensing application from the digital device. The time stamp may correspond to a time at which the sample (e.g., activity data) was recorded by the digital device. These parameters are set when (e.g., during or after) the local sensing application synchronizes with the digital device. For example, the digital device may set and/or store the local read offset based on the memory location of the digital device storage last read by the local digital device. In particular, the local read offset may correspond to the offset of the last memory location read by the digital device incremented by one position or memory location (e.g., the first new activity data memory location). As such, the LRO and LRTS may help the digital device, sensing application and/or the MSP track the data that has been read and/or the data that has not been read, so that read data is not re-transmitted needlessly to the sensing application during synchronization.

Additionally, the Integrating system may define a last synchronization offset (LSO) and a last synchronization time stamp (LSTS). The LSO may refer to the offset (e.g., a memory location identifier) in the sensing application's storage memory at which reading and synchronization of data to the Integrating system begin. The LSO may be different than the LRO if the local synchronization device has read more or less data than the amount of data that has been synchronized to the Integrating system. In some examples, the LRO/LRTS may be updated independently of the LSO/LSTS and vice versa. That is, one set of parameters may be updated without updating the other. On the other hand, if the same data that has been synchronized to the Integrating system has also been read by the sensing application, the LSO and the LRO may be the same.

The sensing application may update (or cause the digital device to update) the LRO and LRTS upon synchronizing data with the digital device. Moreover, the sensing application may update the LSO and LSTS, or cause the LSO and LSTS to be updated upon synchronizing data stored in the digital device to the Integrating system. In some examples, when the intermediary sensing application conducts synchronization between the primary sensing application and the Integrating system, only the LSO and LSTS may be updated since the intermediary sensing application does not, itself, store and synchronize any data. In such an event, the LRO/LRTS may also be updated to indicate to the digital device that further data has been already been synchronized to the Integrating system and that the digital device does not need to further synchronize that data to itself. In one example, the intermediary sensing application may initially request the LSO and LSTS from the Integrating system and use the LSO and LSTS to determine a start point in the sensing application's memory for reading data and synchronizing the data with the Integrating system. In some arrangements, the LRO/LRTS might only be updated if the LSO/LSTS has been updated to a point beyond the LRO/LRTS (e.g., in a data storage progression). Using the above process, the Integrating system may avoid receiving data (e.g., from the digital device) that has already been synchronized to the Integrating system in the past (e.g., directly from the primary sensing application or through the intermediary sensing application).

Additionally or alternatively, data of the sensing application already synchronized to the Integrating system may be deleted from the sensing application. In another example, the data may be deleted if the Integrating system has not been synchronized with that data; in such case of deleted data, a notification or indicator may be provided to the sensing application, a digital device, an intermediary sensing application and/or the Integrating system indicating that synchronization is to be performed with the digital device storing the data that has yet to be synchronized with the Integrating system However, data only synchronized to a digital device, and not the Integrating system, might not be deleted. Examples of circumstances in which data might not be deleted include, e.g., to maintain redundancy as to the synched data (such as until a selected time has elapsed or a selected event occurred, such as synchronization to a predetermined device or number of devices, or to the Integrating system), or in the event the user wishes to later synchronize the data through the intermediary sensing application/application instead of using the digital device, and/or in the case the user wishes to synchronize additional digital devices from the sensing application. In other examples, the data may be deleted if the Integrating system has not been synchronized with that data. Instead, a notification or indicator may be provided to the sensing application, a digital device, an intermediary sensing application and/or the Integrating system indicating that synchronization is to be performed with the digital device storing the data that has yet to be synchronized with the Integrating system. Data synchronized to the Integrating system might not be deleted from the sensing application in some instances if, for example, the data has not yet been synchronized to the currently proximate digital device/application. The deletion of data from the sensing application may be configurable by the user. Alternatively or additionally, data may be deleted once synchronized to the Integrating system and/or to any other device in the event that the amount of space remaining on the sensing application decreases below a specified threshold.

According to other aspects, data from a sensing application may be synchronized to multiple digital devices. In such a configuration, each digital device may set to a different set of LRO and LRTS markers unique to that digital device. In yet other arrangements, if a digital device determines that the user is attempting to synchronize a threshold amount of data from the sensing application, the digital device may provide a message/recommendation to the user to use the intermediary sensing application/application instead. This recommendation may be provided in circumstances where the intermediary sensing application/application is configured to read data off of the sensing application at a faster rate than the digital device (e.g., USB vs. BLUETOOTH).

In yet other examples or arrangements, the above described offsets and synchronization processes may be activity type or device type specific. For example, a running LRO, LRTS, LSO and LSTS may be defined specifically for a buffer or storage area configured to store running data while a basketball LRO, LRTS, LSO and LSTS may be defined for a different buffer or storage area configured to stored basketball data Similar offsets and/or storage areas may be defined for different data recording device types. Accordingly, applications that are configured to synchronize one type of activity or data from one type of device but not another may modify the offsets/parameters for only one of the storage areas/activity types/device types while not affecting the others. Such a configuration may add flexibility to synchronization capabilities. By using the above noted offsets and timestamps, the amount of data that may be synchronized is optimized such that new or unsynchronized data is to be synchronized to a recipient device.

In one embodiment, the collected data is summarized in Table 1

TABLE 1

All Purpose Sensing Features on all devices in the framework, such as Phones, Tablets Desktops, and Laptops

| Features | Attributes Collected |
| --- | --- |
| Day and Time | Timestamp |
| Browsing activity | Browser<br>Requested URL |
| Social Media Log | User's related social information such as likes, biography, personal information, activities, interests . . . |
| Activity on Personal Manager | Focus Folder within the personal manager (Calendar, inbox, sent emails, etc.)<br>Metadata of the focus email within the personal manager (Time, from, to, and subject) |
| Applications' Log | Application Name (Phones and Tablets)<br>Exposed applications on the screen: Window title and process name for each. (PC)<br>Background applications: Window title and process name for each. (PC)<br>Time spent on the App |
| Keyboard Log | Number of correction keystrokes (backspace and delete) in the past second<br>Number of navigation keystrokes in the past second<br>Number of alphanumerical keystrokes in the past second<br>Duration of Usage |
| Communication Log | Wi-Fi (On/Off)<br>3G/4G (On/Off) (Phones and Tablets)<br>Bluetooth (On/Off)<br>WLAN Name<br>WLAN IP Address |

Device specific Additional Sensing Features are listed in Table 2

TABLE 2

Phones and Tablets' Specific Features

| Features | Attributes Collected |
| --- | --- |
| Location Log | City/Region Name<br>Longitude<br>Latitude |

TABLE 2-continued

Phones and Tablets' Specific Features

| Features | Attributes Collected |
|---|---|
| Calls Log | Time Spent in the Place |
| | Phone Number |
| | Type (Incoming, Outgoing, Missed) |
| | Duration of Call |
| Activity Log | Physical Activity |
| | Duration |

TABLE 3

Desktop and Laptop device specific features

| Features | |
|---|---|
| Activity on the Internal Communicator | Identity of the other contact in the chat conversation |
| | Length and timing of message sent |
| | Length and timing of message received |
| Mouse events | Number of mouse clicks in the past second |
| | Number of mouse move events in the past second |
| | Number of mouse wheel move events in the past second |
| Engagement | Number of seconds since last input from mouse or keyboard (Idle seconds) |
| | Window Locking Status |
| Camera | Video Recording |
| | Real-time integration with Facial Expressions Analysis Library |

Figure 3:
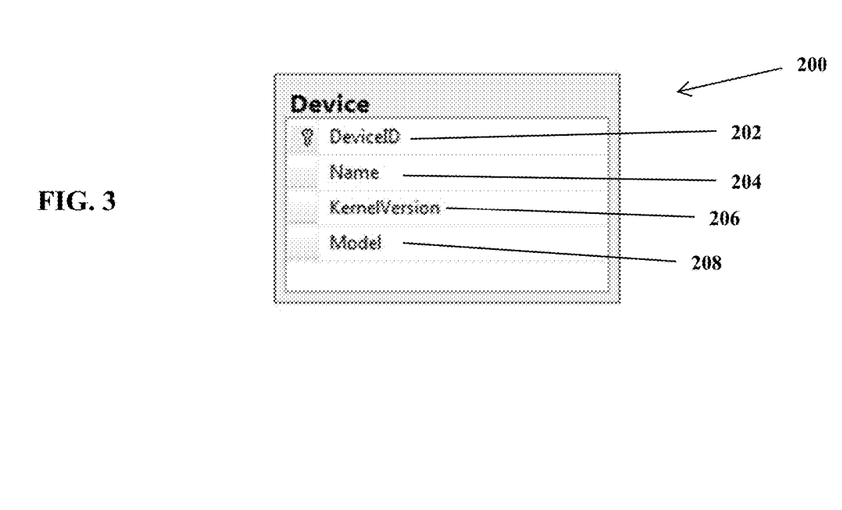
FIG. 3 is a table of the device data.

Multi-Device Continuum and Seamless Sensing Platform 100 includes Device Profile Information where the Multi-Device Continuum and Seamless Sensing Platform 100 logs the devices that are used by the users from which data is collected, as shown in FIG. 3. FIG. 3 is a device data table 200 including a DeviceID 202, a name 204, a Kernel Version 206, and a model 208 data point.

The Multi-Device Continuum and Seamless Sensing Platform 100 includes modularity in adding devices and adding features within devices. The users/developers can add more devices into the overall framework, and any additional needed feature to any of the platforms with plug-in capabilities of the framework components.

The Multi-Device Continuum and Seamless Sensing Platform 100 includes Data Aggregation and Integration. Data integration and aggregation system application organizes raw data sent to the database and adds the appropriate measures and attributes needed which will ease summarization and reporting and positively impact the performance.

The Multi-Device Continuum and Seamless Sensing Platform 100 includes a Schema Design for central and synchronized data warehouse storage and integrated views. The Multi-Device Continuum and Seamless Sensing Platform 100 collects the above mentioned sensing data and features and stores them in a synchronized centric database. The data is stored in a specialized form in order to allow and ease the data analysis and summarization in the later stages.

The Multi-Device Continuum and Seamless Sensing Platform 100 provides a schema that allows us to analyze and summarize the user's daily digital and physical activities over several time intervals and granularities.

Figure 4:
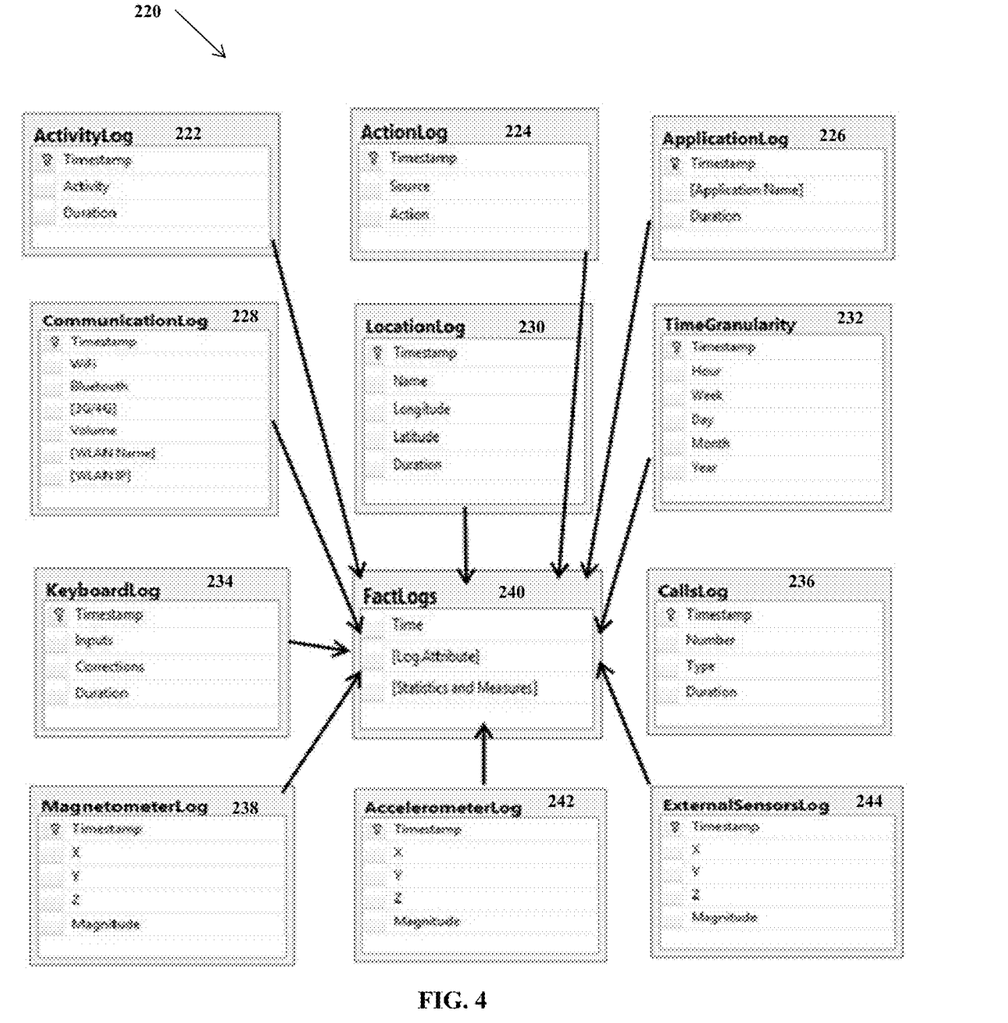
FIG. 4 is a table for part of the data in the database schema.

The database contains as many tables and dimensions as the features collected from every device. Each feature will be represented by a data table. FIG. 4 represents a snapshot of the database schema 220 containing some of the tables that can be found in the database. The "FactLog" table 240 is the centric point where all the other features represent its dimensions. The main focus in the following snapshot is on the features collected from smartphones and tablets, including, but not limited, the following: an activity log 222, an Action log 224, an application log 226, a Communication log 228, a location log 230, a time granularity 232, a keyboard log 234, a calls log 236, a magnetometer log 238, an accelerometer log 242, and an external sensors log 244.

In one embodiment, the Facts Log 240 will join any table or feature from the above tables along with the Time Granularity table 232 to obtain the summary or report needed for a specific feature during a certain time interval. Alternatively, the Facts Log 240 will join any table or feature with Location log 230 to obtain the geographical position for a specific feature.

Time Granularity table 232 is populated through a trigger set on the other tables where every new record gets inserted in the logs tables, the triggers fire and insert the new records in the time granularity table consisting of the time stamp of the original record and divided into the respective attribute in the granularity table.

Figure 5:
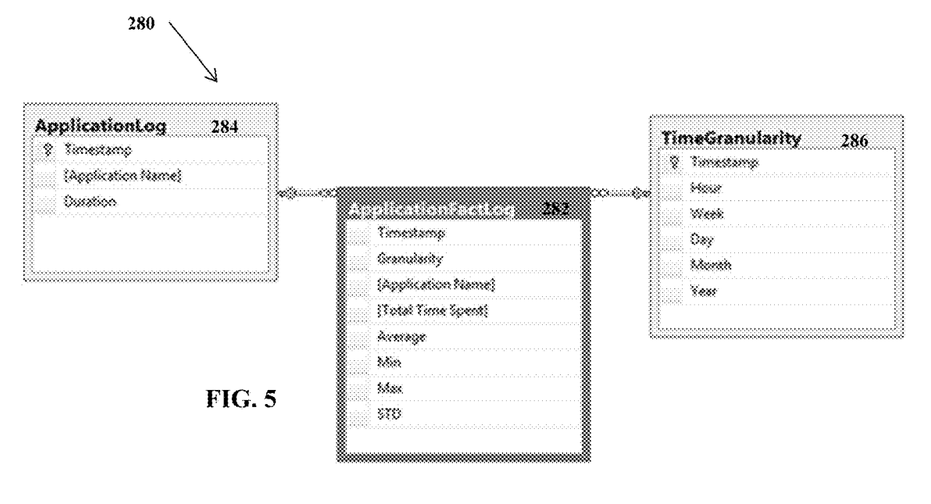
FIG. 5 is a table of an Example of Fact for an Application Log Report during a range of time.

FIG. 5 represents an example for an Application Log Report 280. The Application Fact table 282 has the Application Log 284 and Time Granularity 286 as dimensions.

The Multi-Device Continuum and Seamless Sensing Platform is designed to integrate loggers from multiple devices including smartphones, tablets, computers, and laptops. Thus the user is being continuously tracked, even if they change environments and devices. These logs are synchronized and integrated in one centric store for later analytics.

The Multi-Device Continuum and Seamless Sensing Platform is an integrated platform that supports continuous sensing for the same user seamlessly across multiple devices. The Multi-Device Continuum and Seamless Sensing Platform includes components for: Data collection on individual devices, e.g. phones, tablets and PCs with plug-in capabilities where additional features can be easily added; Collection of hard and soft sensors data from individual smart devices; Enabling smart devices to collect data from external sensors such as bio-sensors and wearable sensors; Integrating corresponding data across multiple devices; Aligning and synchronizing corresponding data from the multitude of devices; and Storing and persisting integrated centrally in preparation for further processing and analytics.

The Multi-Device Continuum and Seamless Sensing Platform may include additional features to be added to the data collecting applications, including, but not limited to: Phone: Calling and Receiving Calls; Contacts: Adding, Deleting and modifying contacts; Messages: Sending and Receiving messages; Adding, Deleting and modifying notes; Gallery: Deleting, viewing pictures; Camera: Taking snapshots, modifying settings; Music: Listening to music (Genre, Lengths, titles); Clock: Adding, Deleting, Snoozing, Dismissing, modifying alarms; Calendar: Adding reminders, Adding schedules; Email, Gmail: Receiving, checking, sending emails; Power Connected/Disconnected; Play store: Downloading applications; Rebooting the phone; Maps: Searching for locations, viewing locations; Calculator; and other digital Wallet functions such as ApplePay™ and Google Wallet™, and the like.

A digital wallet refers to an electronic device that allows an individual to make electronic commerce transactions. This can include purchasing items on-line with a computer or using a smartphone to purchase something at a store. Increasingly, digital wallets are being made not just for basic financial transactions but to also authenticate the holder's credentials. For example, a digital-wallet could potentially verify the age of the buyer to the store while purchasing alcohol. It is useful to approach the term "digital wallet" not as a singular technology but as three major parts: the system (the electronic infrastructure) and the application (the software that operates on top) and the device (the individual portion). An individual's bank account can also be linked to the digital wallet. They might also have their driver's license, health card, loyalty card(s) and other ID documents stored on the phone. The credentials can be passed to a merchant's terminal wirelessly via near field communication (NFC).

Where additional features might be added to the sensing applications, synchronization tests may be completed to test the additional features and synchronization to other data points and features.

In one embodiment, data is collected through the SenseXP application from a Samsung smartphone "Note 3" and through SenseXT from a Samsung Tablet 10.1. It is integrated and saved in a unified database.

In one embodiment, the "SenseXP" application is for android smart phones to collect data from mobile phone services, internal and external sensors, physical and digital activity on the phones. Alternatively, the SenseXP application may be adopted for Apple smart phones.

In one embodiment, the "SenseXT" application is for android tablets to collect data from services, internal and external sensors, physical and digital activity on tablets. Alternatively, the SenseXP application may be adopted for Apple tablets and the like.

In one embodiment, the "SenseXD" application for laptops and PCs to collect digital and physical activity from desktops.

Alternative applications may be adopted for smart watches, such as the Apple Watch and other Android smart watches.

A system to integrate all the collected data from the different devices into unified database on the cloud.

The Multi-Device Continuum and Seamless Sensing Platform may add any needed features to the sensing application to collect data and implementing a service that will prepare the database for data analytics.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached," or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an," and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal," and the like are used herein for the purpose of explanation only unless specifically indicated otherwise.

In one embodiment, a Schema Design for storing Context Annotations is disclosed. An additional table is introduced into the database schema to support the generation of annotated data used in developing personalized machine learning models. The annotations store the context of the user such as his/her physical activity, emotion, and the like. The table is filled by an annotation software implemented in the data collectors components of the applications (such as SenseXP, SenseXT and SenseXP described above). Every certain range of time, a user can enter the necessary context annotation, or it can be automatically recognized. The Context Table is used to label raw data and help in creating the required training data to build context recognition models.

The application provides a new method to collect labeled data for model development through 3 components: 1) User: The user fills a survey describing the context of interest; 2) Phone: The context is saved with a timestamp in external files; and 3) Application: An application designed to parse the files and populate the respective tables in a centric database.

Data Alignment and Synchronization:

The data alignment problem arises when tables with common attributes (or features) need to be joined for creating a richer data set. This problem can be considered as a link prediction problem and attribute-based similarity measures to assess which table tuples (rows) need to be joined together. A machine-learning approach using one-nearest neighbor (1-NN) is used to link the corresponding rows from different tables. Solutions for three different scenarios of data alignment is provided when considering similarity based on: time closeness between row measurements, spatial closeness between row measurements, and a general purpose approach for considering any select set of attribute values for assessing similarity between row measurements. In all cases, the idea is to match tables with less frequent measurements for the chosen attribute with the table with more frequent measures of the same attribute. For time and location based attributes, the table with more granular measures corresponds to the table with more frequent measures.

Time-Based Synchronization and Alignment of Data Records:

The database is populated with records of the collected features in separate tables and with different timestamps at different time granularities. Moreover, the frequency of collecting the features varies from one type of data to another. Thus to create useful records with unified timestamps, the records are matched and synchronized to a common time stamp based on time differences.

There are two types of features collected: 1) Regularly collected data: These data records are collected based on a predefined regular time intervals; and 2) Adhoc data collection: These data records are collected whenever the user triggers the use of the related sensor data. For instance a record of the active application on the phone is logged based on when the user is using the phone.

To integrate and join the data records collected from all types of time intervals, the following procedures are used for different scenarios:

EXAMPLE 1

Joining Data Records Collected at Different Scheduling Time Intervals

Let the table with more frequent feature measurements be considered as the reference table and the less frequent data table be the secondary table.

For each table of less frequent data records collected, create a time synchronization table with two columns representing the matching timestamps between the reference table (most frequent data) and the other table (with less frequent time stamps).

Populate the first column of the synchronization table with all the timestamps from the reference table.

For every timestamp in the first column, select a timestamp from the secondary table (with less frequent time stamps), where the absolute difference between the two timestamps is the least. This approach uses One Nearest Neighbor (1-NN) algorithm for matching.

Figure 6:
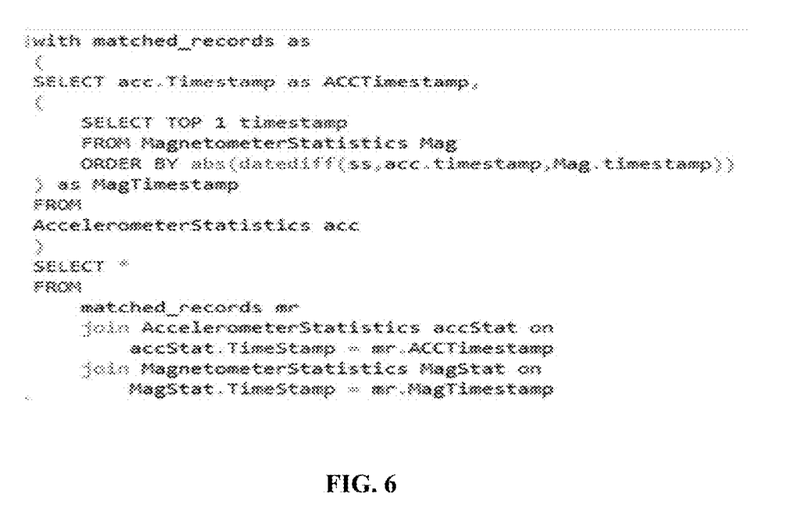
FIG. 6 is a query joining Accelerometer and Magnetometer records.

After obtaining a complete time synchronization table, the complete time synchronization table is joined with the table with frequent records and with the secondary table with less frequent records. The result is a table with records from both tables and all synchronized to the reference time stamps of the most frequent table. An example of the mentioned procedure is shown in FIG. 6 where it represents a query joining accelerometer and magnetometer records (both are scheduled features). In FIG. 6, the time synchronization table is the "Time Granularity" table, the more frequent feature is the "Accelerometer Statistics" table and the less frequent feature is the "Magnetometer Statistics" table.

FIG. 6 is a query joining Accelerometer and Magnetometer records

EXAMPLE 2

Joining Scheduled Data with Adhoc User Collected Data

The user-dependent ad hoc data tables collect the time stamps when each record is added and how much time was spent in the corresponding event or active application.

The table with regularly most frequent scheduled data collection is chosen as the reference table.

For every record in the reference table, select the record from the user-dependent table where the timestamp from the reference table falls in the time range of the record along with its active time window i.e. secondary timestamp<reference timestamp<(secondary timestamp+active duration).

Figure 7:
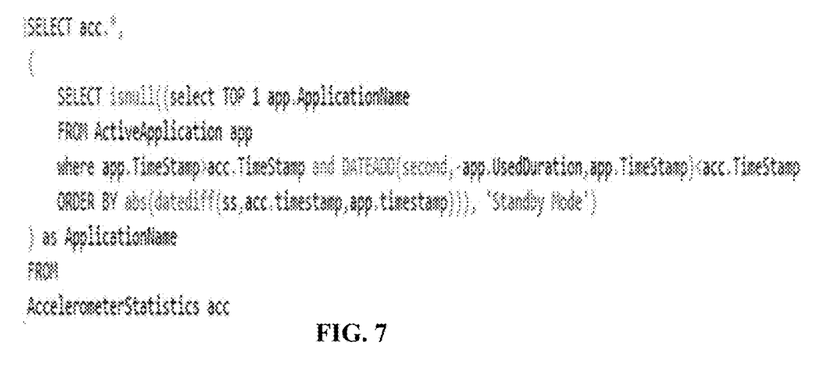
FIG. 7 is a query joining accelerometer and active application records.

An example of the mentioned procedure is shown in FIG. 7 which represents joining an accelerometer table (scheduled feature) and an active application table (user dependent feature):

FIG. 7 is a query joining accelerometer and active application records.

The scheduled table is used as the reference table to avoid any loss of data records. For every record in the reference table, a record is selected from the secondary table to prevent any duplication in the reference records.

EXAMPLE 3

Activity Recognition Model

Figure 8:
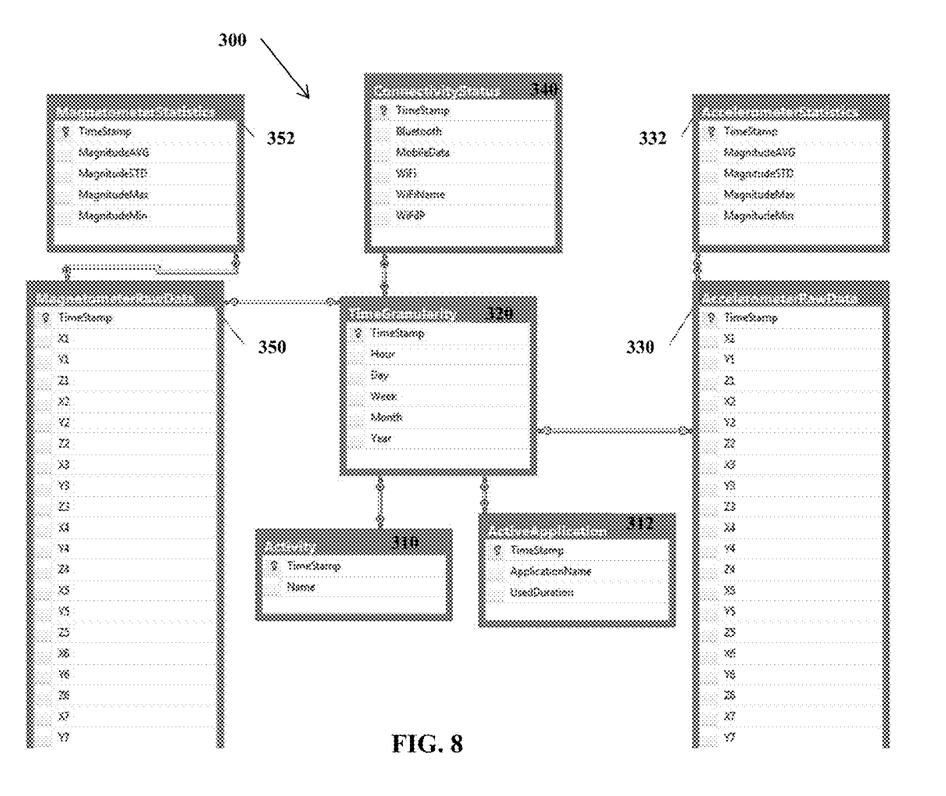
FIG. 8 is a database Schema for Activity Recognition Model.

To illustrate the time synchronization, an Activity Recognition Model 300 is shown in FIG. 8. The Activity table 300 comprises the physical activity 310 and Accelerometer Raw Data 320 and the Magnetometer Raw Data 350 of the user is joined with the Time Granularity table 320 along with the Connectivity Status 340 all the needed features to create the required training data for building an activity recognition model. The Accelerometer Raw Data 320 may include the Accelerometer Statistics 332 and the Magnetometer Raw Data 350 may include the Magnetometer Statistics 352. In one embodiment, the Activity table 300 is filled by the user through a survey scheduled at the user's own choice. In one embodiment, the Active Application 312 table is joined with the Time Granularity 320.

Location-based Synchronization and Alignment of Data Records:

The database is populated with records of the collected features in separate tables and with different geographical or spatial coordinates at different location granularities. Thus to create useful records with unified location coordinates, the records are matched and synchronized to a common location based on spatial differences.

A similar approach to time-based alignment is followed in this method where data are matched using nearest neighbor approach based on spatial differences as the distance feature.

To integrate and join the data records collected from all types of locations, the following procedure is followed:

Let the table with more frequent feature and granular measurements be considered as the reference table and the less frequent data table be the secondary table.

For each table of less frequent data records collected, create a location synchronization table with two columns representing the matching spatial locations between the reference table (most frequent and granular location measurements) and the other table (less frequent spatial locations).

Populate the first column of the synchronization table with all the locations from the reference table.

For every location measure in the first column, select a location from the secondary table (with less granular locations), where the absolute difference between the two locations is the least. This approach uses One Nearest Neighbor (1-NN) algorithm for matching.

After obtaining a complete spatial synchronization table, the complete spatial synchronization table is used to join the table with frequent records and with the secondary table with less frequent records. The result is a table with records from both tables and all synchronized to the reference locations of the most frequent table.

Select Attribute-based Synchronization and Alignment of Data Records:

Asides from time-based and location-based data alignment, there may be cases, where the application or user needs to have data aligned based on particular attribute measures. For such select attribute-based synchronization, the data is compared and matched based on similarity measures derived from the select attributes. The following procedure is followed:

Define a similarity or distance measure based on the select attributes. This can consider numerical, binary, ordinal, text, and other measures depending on the attributes.

Let the table with more frequent measures of the select attributes be considered as the reference table and the table with less frequent measures of the select attributes be the secondary table.

For each table of less frequent data records for the select attributes, create a synchronization table with two columns representing the matching attribute measures between the reference table (most frequent measurements for the select attributes) and the other table (less frequent measurements for the select attributes).

Populate the first column of the synchronization table with all the measures for the select attributes from the reference table.

For every instance measurement of the select attributes in the first column, select an instance measure from the secondary table (with less frequent measures), where the distance based on the defined similarity measure is the least. This approach uses One Nearest Neighbor (1-NN) algorithm for matching.

After obtaining a complete synchronization table, the complete synchronization table is used to join the table with frequent records and with the secondary table with less frequent records. The result is a table with records from both tables and all synchronized to the measures of the select attributes in the most frequent table.

All references cited herein are incorporated by reference in their entireties.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A multi-device continuum and seamless sensing platform system comprising:
    a processor; and
    memory storing computer readable instructions, a software application that, when executed, cause the system to:
    collect sensing data for the user from a plurality of digital devices and continuously over time and space by a sensing application from a plurality of sensors including a wearable sensor, a phone sensor, and a sensor application providing user related data;
    store the data for the user from the plurality of digital devices in a centric integrated system including a storage system and a processing system;
    align the data for the user in a FactLog table, an Application Log Report, a query joining an Accelerometer record and a Magnetometer record, and a database Schema for an Activity Recognition Model;
    synchronize the collected sensing data from the sensing application to an integrated system; and
    process the aligned and synchronized sensing data across time by using a time stamp when data is collected from each sensor and space by keeping track of each device in a database represented by the FactLog Table and the database Schema for the Activity Recognition Model, wherein the database includes data synchronization, a plurality of aggregation queries for joining sensing data in a plurality of time and fact tables represented by the FactLog table, and a trigger for inserting complementary data for a new sensing data point, and automatically keeping track of the plurality of devices and the sensing data a user is using, and installing a plurality of soft applications on the plurality of digital devices to collect digital data and receive data from sensors providing data related to the user in a device data table;
    wherein the plurality of digital devices are selected from the group consisting of compute, sensing and personal devices;
    a mechanism to synchronize data at different time granularity levels for data coming from different sources with different time stamps in an Application Log Report and the query joining the Accelerometer word and the Magnetometer record, wherein the mechanism provides for data alignment and that is independent of how the data is processed, a database design consisting of the FactLog table and a time granularity table joined with a logging table selected from the group of an action table or a communication table from the FactLog table, to result in an aggregation over space and time for data analysis and analytics; and
    the time granularity table is populated through a trigger set on the other tables where every new record gets inserted in the logs tables, the trigger set fires and inserts the new records in the time granularity table consisting of the time stamp of the original record and divided into a respective attribute in the granularity table; and the time granularity table is used in the aggregation queries for data mining and analytics from the query joining the Accelerometer record and the Magnetometer record.

2. The system of claim 1, wherein the sensing data is selected from the group consisting of: bio-metric data, browsing activity, application log on the plurality of devices, keyboard log including a number of correction keystrokes (backspace and delete) in the past second, a number of navigation keystrokes in the past second and a number of alphanumerical keystrokes in the past second, communication log, emails and messages, social networking activity, mouse events including a number of mouse clicks in the past second, a number of mouse move events in the past second, and a number of mouse wheel move events in the past second, physiological data, environmental data, and digital wallet data.

3. The system of claim 2, wherein the digital devices are selected from the group consisting of: a laptop computer, a mobile phone, a table, a health care device, a smart watch, or a sensing device; and wherein the plurality of digital devices are data collectors and receiving ends of data, and the soft applications include a plug-in capability to enable the user to select from the plurality of sensors.

4. The system of claim 3, wherein the collected data comprises a Device ID, name, Kernel Version, and Model number, wherein the plurality of sensors are registered in the FactLog Table and saved as the personal devices of the user along with a metadata in the database; wherein the metadata includes: software installed, kernel version and the version of installed sensing application; and the system provides a plurality of queries to synchronize and aggregate the data with the plurality of digital devices.

5. The system of claim 4, further comprising analyzing and reporting the collected data by the integrated system; wherein the normalization, calibration and calculation of a plurality of statistical features are done directly on the plurality of sensing devices before data transmission and saved at the received end of the data transmission.

6. The system of claim 5, wherein the collected data is saved in the database Schema for Activity Recognition Model and the FactLog Table collected for the user; and a database schema design is presenting a type of the user's data and how they are installed, where the FactLog Table is provided in tables selected from the group consisting of an activity log table, an action log table, an application log table, a communication log table, a location log table, a time granularity table, a keyboard log, the FactLog table, a call log table, a magnetometer log table, an accelerometer log table, and an external sensor log table.

7. A multi-device continuum and seamless sensing platform apparatus comprising:
    a processor; and
    memory operatively coupled to the processor and storing computer readable instructions that, when executed, cause the apparatus to:
    receive collected data for the user from a plurality of digital devices continuously over time and space from a plurality of sensors including a wearable sensor, a phone sensor, and a sensor application providing user related data;
    store collected data for the user from the plurality of devices in an integrated system;
    align the data for the user in a FactLog table, an Application Log Report, a query joining an Accelerometer record and a Magnetometer record, and a database Schema for an Activity Recognition Model;
    synchronize the collected data from the sensing application across the plurality of digital devices and the integrated system; and
    process the aligned and synchronized sensing data across time by using a time stamp when data is collected from each sensor and space by keeping track of each device in a database represented by FactLog Table and the database Schema for the Activity Recognition Model, wherein the database includes data synchronization, a
        plurality of aggregation queries for joining sensing data in a plurality of time and fact tables represented by the FactLog table, and a trigger for inserting complementary data for a new sensing data point; and
    an apparatus to automatically keeping track of the plurality of devices and the sensing data a user is using, and installing a plurality of soft applications on the plurality of digital devices to collect digital data and receive data from sensors providing data related to the user in a device data table;
        wherein the plurality of digital devices are selected from the group consisting of compute, sensing and personal devices
        a mechanism to synchronize data at different time Granularity levels for data coming from different sources with different time stamps in an Application Log Report and the query joining the Accelerometer record and the Magnetometer record, wherein the mechanism provides for data alignment and that is independent of how the data is processed, a database design consisting of the FactLog table and a time granularity table joined with a logging table selected from the group of an action table or communication table from the FactLog table, to result in an aggregation over space and time for data analysis and analytics; and
    the time granularity table is populated through a trigger set on the other tables where every new record gets inserted in the loos tables, the tripper set fires and inserts the new records in the time granularitv table consisting of the time stamp of the original record and divided into a respective attribute in the granularity table; and the time granularity table is used in the aggregation queries for data minim and analytics from the query joining the Accelerometer record and the Magnetometer record.

8. The apparatus of claim 7, wherein the collected data is the device data table selected from the group consisting of: bio-metric data, browsing activity, application log on the plurality of devices, keyboard log including a number of correction keystrokes (backspace and delete) in the past second, a number of navigation keystrokes in the past second and a number of alphanumerical keystrokes in the past second, communication log, emails and messages, social networking activity, mouse events including a number of mouse clicks in the past second, a number of mouse move events in the past second, and a number of mouse wheel move events in the past second, physiological data, environmental data, and digital wallet data.

9. The apparatus of claim 8, wherein the digital devices are selected from the group consisting of: a laptop computer, a mobile phone, a table, a health care device, a smart watch, or a sensing device; and wherein the plurality of digital devices are collectors and receiving ends, and the soft applications include a plug-in capability to enable the user to select from the plurality of sensors.

10. The apparatus of claim 9, wherein the collected data comprises a Device ID, name, Kernel Version, and Model number, wherein sensors are registered and saved in the FactLog Table as the personal devices of the user along with a metadata in the database; wherein the metadata includes: software installed, kernel version and the version of installed sensing application; and the system provides a plurality of queries to synchronize and aggregate the data with the plurality of digital devices.

11. The apparatus of claim 10, wherein the integrated system further analyzes and reports the collected data to the plurality of digital devices; wherein the normalization, calibration and calculation of a plurality of statistical features are done directly on the plurality of sensing devices before data transmission and saved at the received end of the data transmission.

12. The apparatus of claim 11, wherein the collected data is saved in an elaborate description for the various types of tables collected for the user; and a database schema design is presenting a type of the user's data and how they are installed, where the database is provided in tables selected from the group consisting of an activity log table, an action log table, an application log table, a communication log table, a location log table, a time granularity table, a keyboard log, the FactLog table, a call log table, a magnetometer log table, an accelerometer log table, and an external sensor log table.

* * * * *